Patented July 13, 1937

2,086,746

UNITED STATES PATENT OFFICE 2,086,746

STABILIZER FOR HORTICULTURAL SPRAYS

Alwyn C. Sessions, New Brunswick, N. J., assignor to California Spray-Chemical Corporation, Berkeley, Calif., a corporation of Delaware No Drawing. Application September 16, 1933, Serial No. 689,874

21 Claims. (Cl. 167—14)

This invention relates broadly to the stabilization and/or buffering of horticultural sprays and dusts and specifically to the nature and the method of preparation and use of chemical compositions for effecting the same.

It has long been recognized by plant pathologists, economic entomologists and horticulturalists in general that materials which are toxic or destructive to insect life and fungus growths are invariably more or less injurious to the plant or arboreal hosts. The choice of materials and compositions for pest control has therefore come to be an ever increasing series of compromises in an attempt to arrive at a composition for each specific infestation which shall combine the maximum of destruction with the minimum of damage to the host.

Little difficulty has been experienced in selecting or devising compositions possessing the requisite power of destruction. The real problem has arisen in the attempt to retain a high degree of potency and at the same time to avoid undue injury to the fruit and foliage treated.

Out of the widespread interest in this specific phase of the problem has inevitably grown a mass of speculation and many theories as to the mechanism by which harm is brought to the growing host. Of such theories the one which has been most widely accepted and has in the past proven most helpful has ascribed the burning or scorching of foliage to acid existing in or liberated by the spray material.

Considerable reduction in host damage was accordingly effected by the use of carefully neutralized or slightly alkaline sprays. Still further improvement was realized by including in such substantially neutralized sprays active ingredients of the lowest possible water solubility compatible with a lethal concentration of the active component.

For these reasons the relatively insoluble lead arsenate has largely replaced the soluble arsenicals, copper carbonate has been introduced in place of the sulphate and free sulfur has largely replaced the more active polysulfides or lime-sulfur sprays.

Despite the very large improvements which have thus been realized serious foliage burn and russeting of fruit are still all too often encountered. In a majority of such cases the damage is certainly not due to faulty preparation of the spray material or to its improper application. It thus appears that this residual damage must be ascribed to changes in the spray materials brought about, subsequent to application, by meteorological and atmospheric conditions possibly in coaction with the normal biological reactions of the host itself. Since these conditions have appeared to be entirely beyond human control there has seemed little further that could be done to eliminate such spray damages.

It has, however, now been discovered that in a very great many cases this hitherto unavoidable damage to growing foliage and fruit can be substantially avoided without loss in the insecticidal and/or fungicidal power of the more or less well known sprays and in fact combinations of spray materials have been found to be practicable through this discovery which were formerly considered entirely impossible.

My broad discovery is that the incorporation of certain negative radicals in a spray material can have a very pronounced and beneficial effect in reducing damage to the sprayed host by many and possibly by all of the ordinary spray materials.

More specifically this discovery is that the silicate and certain equivalent radicals exert such an effect.

This discovery still further embraces the fact that the silicate or equivalent radical may be either chemically combined with one of the active metallic ingredients of the spray material or in most cases it may, to even greater advantage, be introduced in combination with a metallic element not ordinarily a component of horticultural sprays.

My original discovery pertained to the former such alternative method of combination as disclosed in copending applications #566,785 and #719,041 which disclose respectively the preparation and use of complex copper and mercury silicates.

The herein disclosed phase of my invention relates more particularly to the second method wherein the silicate or equivalent radical is introduced into the spray composition chemically combined with a metal not necessarily itself toxic or active in such preparations.

As a typical example of such operation, it has been discovered that if a substantially neutral zinc silicate is incorporated in the ordinary copper, arsenic, arsenic-oil or arsenic-copper-oil sprays, a marked stabilizing, protecting or buffering action results which in all cases materially reduces, and in many instances completely eliminates the usual serious damage to the sprayed plant or tree. Other complex silicates which I have found to operate with similar desirable results include those of calcium, iron and aluminum.

Other compounds which appear to act in an entirely similar manner include certain relatively insoluble phosphates, borates and aluminates as will be more fully brought out later.

While the facts of this discovery are, and hence the breadth of my invention is independent of any theory which might be advanced in explanation, such a theory consistent with all the known facts may aid those skilled in the art to more clearly visualize the far-reaching significance and the broad applicability of the discovery.

As previously pointed out, the formerly accepted idea was that burning or scorching of tender foliage and russeting of fruit by sprays and particularly by those containing sulfur, arsenic, copper or mercury compounds is, at least in part, due to an acid reaction. This idea was supported by the well known fact that with the introduction of careful control of the acidity of spray compositions such damage was appreciably reduced. It seems entirely reasonable, therefore, that the residual damage resulting from sprays that are substantially neutral at the time of application may be due to acids subsequently liberated by oxidation, by hydrolysis or by still other reactions of the spray materials when subjected to the varying influences of nature. That such reactions will depend largely upon the atmospheric and meteorologic conditions existing in a specific locality immediately following the deposition of the spray ingredients is, of course, obvious. Such conditions will vary between rather wide limits from place to place and even at the same place from time to time and hence the extent of reaction and attendant damage should be similarly variable. The fact that the extent of spray damage is quite variable and apparently entirely erratic is thus in complete agreement with this theory.

Still another point of common knowledge within the industry is that where an excess of lime is compatible with the other ingredients of a spray composition, and at the same time with the character of the host receiving spray treatment, its inclusion appreciably reduces spray damage. Thus the beneficial effect produced by the presence of this base, which, due to its relative insolubility, persists for a considerable time, is also in complete accord with the hypothesis that acids from some source are primarily responsible for what we have called residual spray damage.

The principle of buffer action in solution is well known and has received many valuable applications in the broad field of applied chemistry. In brief such a chemical buffer is usually the salt of a weak acid or a weak base, or of both, which by its presence at appreciable concentration in solution limits the maximum acidity (free hydrogen ion) or the maximum alkalinity (free hydroxyl ion) possible in that solution. It is thus a chemical safety valve or governor.

While the idea of buffer action and of buffered reactions has in the past been applied almost entirely to substances in ordinary solution and at moderate concentration there is no apparent reason why a typical buffer action might not also exist between relatively very insoluble solids when in mutual contact and equilibrium with an intermediate solution however dilute such solution may be.

It is my present belief that herein lies the mechanism of the beneficial action which I have discovered to result from the inclusion of the silicate or equivalent negative radicals of weak acids in horticultural sprays.

In accordance with this hypothesis of buffer action as an explanation of the beneficial results obtained, the silicate ion being the ion of the extremely weak silicic acid can limit free acidity which might be produced on the foliage of a sprayed plant or tree to such a very low value that it can no longer bring about serious burning or scorching.

High buffering power is, however, not all that is required of a stabilizing agent in order that its inclusion in a spray shall adequately protect against burning. If it were, any silicate or any salt of an acid as weak as silicic acid would be equally effective. This I have found not to be the case.

As is well known to those skilled in the art a parasiticide must remain active and in place for many days or even weeks in order to effect a satisfactory kill. It thus becomes obvious that in order adequately to protect the host a stabilizer or buffer must also remain active and in place throughout the active life of the primary parasiticidal ingredients. The buffering radical must therefore be present in a spray material in such combination as will render it substantially equally available (soluble) with such primary ingredients.

This conclusion is amply supported by the fact, clearly brought out by the results of test experiments hereinafter recorded, wherein it is shown that zinc silicate is more effective in preventing host damage when used with a lead arsenate-oil spray than is lime. While lime, a strong base, is undoubtedly a better insurance against the generation of harmful quantities of acids so long as it remains in place and in active form than is zinc silicate, lime is also quite soluble and is hence rapidly lost through the action of rain, dew and carbon dioxide. The zinc silicate therefore probably gains its marked superiority in that it is sufficiently insoluble to remain in place on the sprayed surface during the entire active life of the arsenate and oil and is still sufficiently soluble to provide silicate ion adequate to control any acidity that may be produced.

The two major characteristics which therefore would appear to be required in a spray stabilizer or buffer in order that it satisfactorily protect sprayed plants or trees against foliage burn are high buffering power, substantially equivalent to that possessed by the silicate ion and low solubility, substantially equivalent to that possessed by zinc silicate. While it has not yet been possible to determine with any certainty the numerical magnitude of these two requirements it now appears that a salt to be an effective buffer or stabilizer under these conditions should certainly not be more soluble than about 0.1 gm./liter and should contain the negative ion of an acid whose dissociation constant is not greater than $1 \times 10^{-10}$.

It is my present belief that all compounds satisfying simultaneously these two requirements will be found to possess substantially similar stabilizing and protecting power. This belief has been justified without exception by my experiments to date. I have, for instance, found that both calcium and iron silicates when properly prepared are the substantial equivalent of zinc silicate as stabilizers and may in many instances be employed with equally beneficial results.

It will, however, be apparent to those skilled in the art that zinc silicate may often possess an advantage over other equally efficient stabilizers in that, as is well known, the zinc itself has some parasiticidal value. While by no means the equivalent of the usual copper compound a so-called "zinc-bordeaux" has received considerable attention as a fungicide.

In order that my invention may be more effectively practiced by those skilled in the art the preparation of a highly efficient zinc silicate will be discussed in some detail.

Broadly, a dilute solution of a soluble silicate is added slowly and with agitation to a dilute solution of a soluble zinc salt until substantial neutrality to phenol red is attained. The colloidal zinc silicate gel thus formed is collected, washed substantially free from soluble salts and reduced to a paste or a dry powder for future use. Sodium silicate or waterglass and zinc sulfate are the readily available commercial ingredients which I have employed though equivalent compounds can be used without appreciably changing the result.

As is well known, commercial sodium silicate is available in a number of grades the ratio of soda to silica, $Na_2O/SiO_2$, and hence the alkalinity of the solution varying between rather wide limits. I have found that the pH value of the precipitating mixture very materially influences the physical nature of the gel formed as well as its power as a buffering agent. Precipitation is most complete and the resultant product has the most satisfactory characteristics when the reaction is effected in a substantially neutral solution, pH 6.5 to 7.5. I have, however, employed the product from solutions of quite different pH. If the alkalinity is high, pH>8.0, due to excess soda or to the addition of ammonium hydroxide the lyophyllic character of the gel decreases and the buffering power of the final washed and concentrated product is materially lessened. As the alkalinity of the silicate increases the percentage of zinc in the final product also increases and the buffering power per unit cost is correspondingly reduced.

When precipitation is complete, pH $7.0\pm0.2$, the gel is filtered off, washed free from sodium sulfate and used either as a paste or dried and ground for use as a powder. In most cases I have found it slightly more desirable to employ the paste which has not been dried wherever possible, since once dried it may be difficult to bring the powder completely back to its original colloidal form.

Either the paste or powder form may, however, be mixed in concentrated form with the concentrated insecticides and/or fungicides which it is desired to stabilize or the mixing may be done in the spray tank by the user.

The preparation of a very active complex silicate of zinc may be more readily followed by reference to the following specific example: fifty pounds of zinc sulfate is dissolved in fifty gallons of water, one hundred and forty pounds of sodium silicate (water glass) is dissolved in fifty gallons of water and slowly added to the zinc sulfate solution with violent agitation until the pH of the mixture reaches approximately 7.0 whereupon substantially all of the zinc will have been precipitated. The precipitate is then filtered off in any appropriate manner, washed substantially free from soluble salts and barrelled as a paste or dried and ground to a powder.

The value of zinc silicate, so prepared, as a buffer for horticultural sprays has been established by a series of carefully controlled experiments. Its efficiency is illustrated in the following tables of results wherein are given the percentages of foliage injury when standard spray materials have been used with and without the addition of zinc silicate. Young horticultural pole and lima beans were the plants used in these particular experiments, chosen because of the well known high susceptibility of the bean plant to arsenical injury.

I. Lima beans

| Spray materials | Percent and degree of foliage injury | | |
|---|---|---|---|
| | None | Slight | Severe |
| 1. Lead arsenate* | 59 | 36 | 5 |
| 2. Summer oil* (Orthol K medium) | 95 | 5 | 0 |
| 3. Lead arsenate+oil | 0 | 4 | 96 |
| 4. Lead arsenate+oil+coposil powder* (2#/100 gal.) | 28 | 54 | 18 |
| 5. No. 4+zinc silicate powder (2#/100 gal.) | 90 | 9 | 1 |
| 6. Lead arsenate+oil+coposil paste | 54 | 36 | 10 |
| 7. No. 6+zinc silicate paste | 91 | 9 | 0 |
| 8. Lead arsenate+oil+lime* | 68 | 30 | 2 |
| 9. Blank (No spray applied) | 100 | 0 | 0 |

*Note: Coposil is the complex copper ammonium silicate described in copending application No. 566,785. Lead arsenate and lime each @ 4#/100 gal. and oil @ 1%.

II. Horticultural pole beans

| Spray materials* | Percent and degree of injury | | |
|---|---|---|---|
| | None | Slight | Severe |
| 1. Lead arsenate | 21 | 40 | 39 |
| 2. Lead arsenate+oil | 0 | 10 | 90 |
| 3. Lead arsenate+oil+coposil | 10 | 13 | 77 |
| 4. No. 3+zinc silicate | 70 | 27 | 3 |
| 5. Lead arsenate+oil+lime | 44 | 12 | 44 |
| 6. Oil (Orthol K medium) | 98 | 2 | 0 |

*All amounts the same as in Table I.

The advantages of a neutralizer, lime, over the arsenic-oil sprays alone and of the zinc silicate buffered sprays over lime, (previously referred to) are so obvious from these results as to need no further comment.

While the data is not yet complete tests now in progress on young apple trees for comparing the relative buffering power of substantially similarly prepared silicates of zinc, calcium and iron show, as previously mentioned their substantial equivalence.

While the proportions of ingredients employed in the above tests indicate something of the proper quantities to be employed they are in no way intended to limit the quantities or proportions or the specific combinations of ingredients which may be employed.

Neither is the fact that only results of tests employing the complex silicate type buffers in liquid sprays to be construed as indicating that their use is limited thereto. In fact I have already conclusively demonstrated the applicability of these materials both in horticultural dusts, and in powders for seed disinfection.

The breadth of my invention and what I claim is:

1. A parasiticide including a relatively water-insoluble chemical buffering and stabilizing agent consisting of the salt of a weak inorganic acid.

2. A parasiticide including a relatively water-insoluble chemical buffering and stabilizing agent distinct from and in addition to the usual toxic parasiticidal ingredients said agent consisting of the salt of a weak, water-insoluble, inorganic acid.

3. A parasiticide including as a buffer or stabilizing agent the salt of an inorganic acid whose dissociation constant is less than about $1 \times 10^{-10}$, such salt having a solubility in water less than 0.1 gms./liter, said salt being distinct from and in addition to the usual parasiticidal ingredients.

4. A parasiticide comprising zinc silicate as a buffering and stabilizing agent.

5. A parasiticide comprising as a buffering and stabilizing agent a zinc silicate hydrogel substantially free from soluble salts.

6. A parasiticide comprising as a buffer for hydrogen ions a salt of an inorganic acid at least as weak as silicic acid, said salt being at least as insoluble as zinc silicate.

7. A parasiticide comprising as a buffering and stabilizing agent a calcium silicate hydrogel.

8. A parasiticide comprising iron silicate as a buffering and stabilizing agent.

9. The method of buffering and stabilizing horticultural sprays which consists in including therein a relatively insoluble hydrogel salt of a weak inorganic acid with an inorganic base equivalent in weakness and water-insolubility to calcium hydroxide in addition to the usual toxic parasiticidal ingredients.

10. A new composition comprising lead arsenate and a relatively insoluble chemical buffering agent consisting of the salt of a weak inorganic acid.

11. A new composition comprising lead arsenate and a relatively insoluble metal silicate.

12. A new composition comprising lead arsenate and zinc silicate.

13. A new composition comprising lead arsenate, a substantially insoluble copper compound and a relatively insoluble chemical buffering agent consisting of the salt of a weak inorganic acid.

14. A composition as in claim 13 in which the chemical buffer is a metal silicate.

15. A composition as in claim 13 in which the chemical buffer is zinc silicate.

16. A horticultural spray consisting of an aqueous suspension of solids, comprising lead arsenate and a relatively insoluble chemical buffering agent consisting of the salt of a weak inorganic acid, and having a quantity of hydrocarbon oil dispersed therein.

17. A horticultural spray as in claim 16 in which the chemical buffering agent is a metal silicate hydrogel.

18. A horticultural spray as in claim 16 in which the chemical buffering agent is zinc silicate.

19. A horticultural spray consisting of an aqueous suspension of solids, comprising a substantially insoluble copper compound and a relatively insoluble chemical buffering agent consisting of the salt of a weak inorganic acid, and having a quantity of hydrocarbon oil dispersed therein.

20. A horticultural spray as in claim 19 in which the chemical buffering agent is a metal silicate hydrogel.

21. A horticultural spray as in claim 19 in which the chemical buffering agent is zinc silicate.

ALWYN C. SESSIONS